United States Patent
Click, Jr.

(10) Patent No.: US 7,401,202 B1
(45) Date of Patent: Jul. 15, 2008

(54) MEMORY ADDRESSING

(75) Inventor: Cliff N. Click, Jr., San Jose, CA (US)

(73) Assignee: Azul Systems, Inc., Mountain View, CA (US)

( * ) Notice: Subject to any disclaimer, the term of this patent is extended or adjusted under 35 U.S.C. 154(b) by 249 days.

(21) Appl. No.: 11/227,423

(22) Filed: Sep. 14, 2005

Related U.S. Application Data

(60) Provisional application No. 60/610,028, filed on Sep. 14, 2004.

(51) Int. Cl.
*G06F 9/25* (2006.01)
*G06F 9/34* (2006.01)

(52) U.S. Cl. .................. 711/214; 711/2; 711/212; 711/201; 711/219

(58) Field of Classification Search .......... 711/214, 711/2
See application file for complete search history.

(56) References Cited

U.S. PATENT DOCUMENTS

| | | | |
|---|---|---|---|
| 5,680,568 A | * | 10/1997 | Sakamura ............ 711/220 |
| 6,014,723 A | | 1/2000 | Tremblay et al. |
| 6,189,086 B1 | * | 2/2001 | Yamaura ............ 712/205 |
| 6,408,383 B1 | | 6/2002 | Tremblay et al. |
| 6,542,990 B1 | | 4/2003 | Tremblay et al. |
| 6,892,295 B2 | | 5/2005 | Saulsbury |
| 2004/0003209 A1 | * | 1/2004 | Mitsuishi et al. ......... 712/225 |

* cited by examiner

*Primary Examiner*—Kevin Ellis
*Assistant Examiner*—Hamdy S Ahmed
(74) *Attorney, Agent, or Firm*—Van Pelt, Yi & James LLP

(57) ABSTRACT

Addressing memory includes receiving a first operand to a memory addressing operator, receiving a second operand to the memory addressing operator, performing sign extension on the first operand to provide a sign-extended operand, shifting the sign-extended operand to provide a shifted, sign-extended operand, and adding the shifted, sign-extended operand to the second operand. The second operand has a different bit length than the first operand.

20 Claims, 4 Drawing Sheets

MEMORY ADDRESSING

CROSS REFERENCE TO OTHER APPLICATIONS

This application claims priority to U.S. Provisional Patent Application No. 60/610,028 entitled VIRTUAL MACHINE filed Sep. 14, 2004, which is incorporated herein by reference for all purposes.

BACKGROUND OF THE INVENTION

In many computer systems, both the hardware and the software share the same bit-size environment. Since the hardware and the software are limited to the same address space, operations such as memory access are straightforward and do not require additional computation. For example, a 32-bit hardware platform is typically designed to support a 32-bit environment. A 32-bit software programming language operating in this environment can typically address up to 4 Gb of memory. In some systems, however, the hardware and the software have different bit length. This situation may arise when a new generation of hardware becomes available and is required to support existing software. For example, the Java programming language is currently implemented as a 32-bit language. A new 64-bit processor is designed to support a 64-bit Java Virtual Machine (VM) environment, in which more than 4 Gb of memory is available to the software operating in the VM environment. To access memory in the 64-bit Java VM environment using the 32-bit Java language typically requires converting 32-bit values into 64-bit addresses. The conversion usually costs extra processing cycles and introduces inefficiency to the system. It would be desirable if existing software programs and languages could operate on hardware devices that support a different bit length. It would also be useful if frequently occurring operations such as memory addressing could be implemented efficiently in such systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Memory addressing is disclosed. In some embodiments, at least two operands to a single memory addressing operator are received. As used herein, an operator refers to an instruction, an addressing mode (such as addressing modes commonly used on X86 or 68000 CPUs), or other similar unit of processor activity. An operand refers to the input value used by the operator to perform the desired operation. An operand may include a register or memory address, a literal constant, a label, or any other appropriate values. In some embodiments, the operands have different bit lengths. Within the same memory addressing operator, the shorter operand is sign-extended, shifted and added to the longer operand. In some embodiments, the shorter operand is a 32-bit operand indicating an index location and the longer operand is a 64-bit operand indicating a base address. In some embodiments, the shorter operand is 16-bit and the longer operand is 32-bit. Other bit values are possible.

Figure 1:
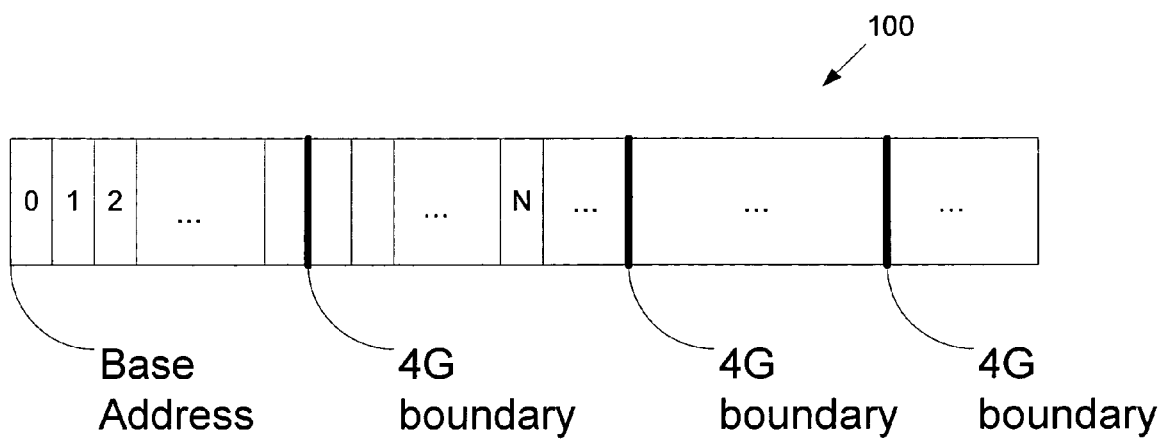
FIG. 1 is a diagram illustrating the memory layout of an array example in a 64-bit environment.

FIG. 1 is a diagram illustrating the memory layout of an array example in a 64-bit environment. In this example, array 100 is stored in a contiguous memory region starting at the address labeled "base address". The base address, like other addresses accessible by the hardware, has a 64 bit value. The array has a number of entries with indexes of 0, 1, 2, etc. One way to access a specific entry with index N in the array is to determine the entry address. Given entries with fixed size, the entry address is computed by multiplying the entry size by N to determine an offset, and adding the offset to the base address. As will be shown in more details below, if the entry address of entry N is in a different 4 Gb segment than the base address, the 64-bit hardware is required to perform additional functions to accommodate a 32-bit language such as Java.

Figure 2:
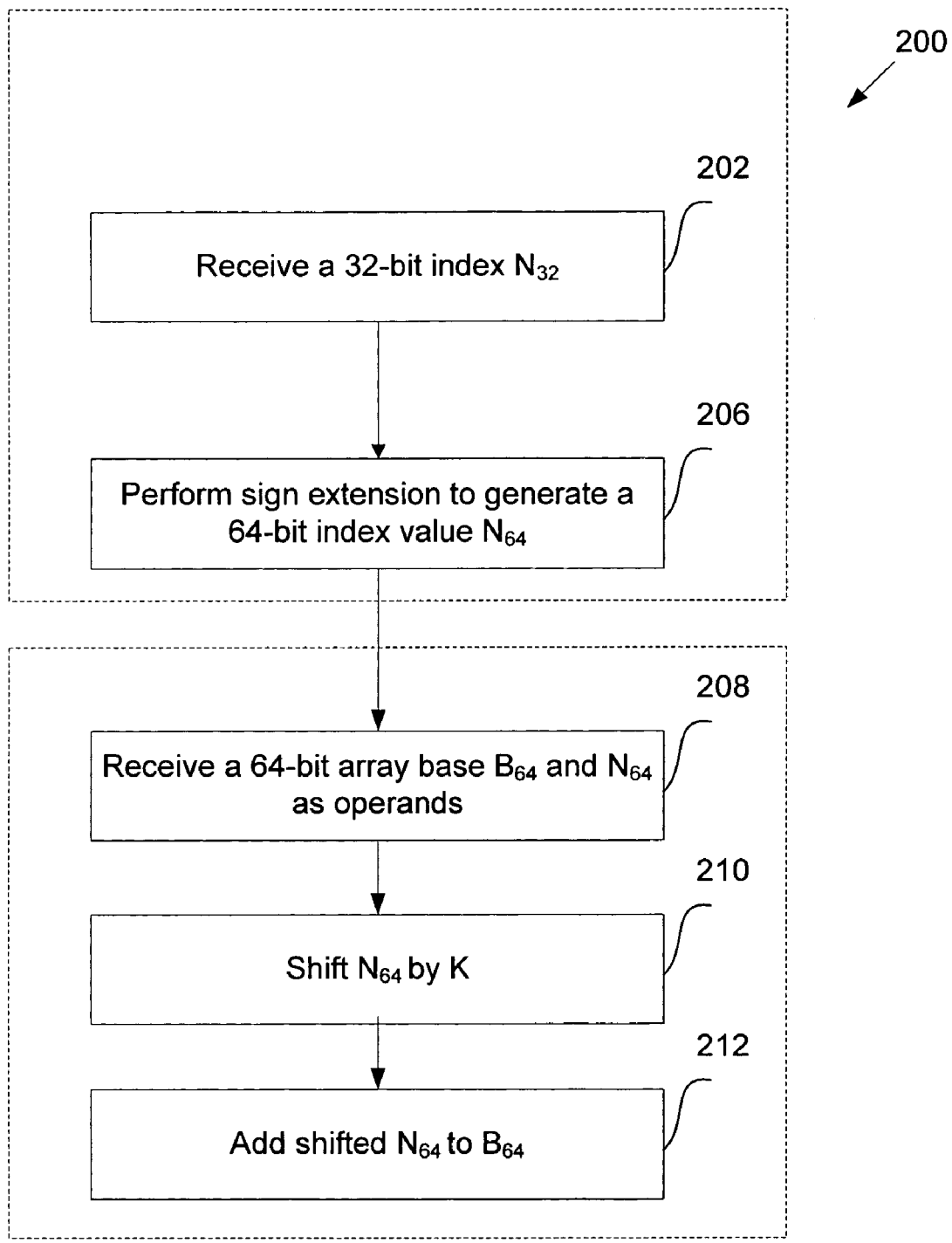
FIG. 2 is a flowchart illustrating a process for array addressing according to some systems.

FIG. 2 is a flowchart illustrating a process for array addressing according to some systems. In this example, process 200 is performed on a 64-bit processor. The processor implements a specific computer architecture, which defines an instruction set that describes various aspects of the computer architecture visible to a programmer, including the native data types, instructions, registers, addressing modes, memory architecture, etc. A typical instruction includes an instruction name, and optionally one or more operands. During operation, an instruction is translated into machine language that directs the processor to perform its functions. When an instruction is executed by the processor, the processor determines the instruction, the operands of the instruction if appropriate, and carries out corresponding operations using registers, multiplexers and/or other appropriate hardware components. In some embodiments, a single instruction directs the processor to perform multiple function steps. For example, a shift_and_add instruction directing the processor to shift one operand and add the result to the other operand is available on many X86 CPUs and IA64 CUPs.

Process 200 is implemented as two separate instructions in this example. The instructions are expressed as:

sign_extend N32, N64;

shift_and_add N64, B64.

The first instruction, sign_extend, includes steps 202-206. The instruction initiates when the processor receives from the 32-bit software an index $N_{32}$ that is 32 bit long (202). A sign extension is performed on $N_{32}$ and a 64-bit value $N_{64}$ that is equivalent to $N_{32}$ is generated and stored in the register (206). The next instruction, shift_and_add begins when a 64-bit base address $B_{64}$ and $N_{64}$ are received as operands (208). Assuming that the size of an array entry is $2^K$, the offset is computed by multiplying $N_{64}$ with K. In this example, the multiplication is implemented by shifting $N_{64}$ K positions to the left (210). Finally, the entry address of entry N is computed by adding the shifted $N_{64}$ to $B_{64}$ (212).

Figure 3:
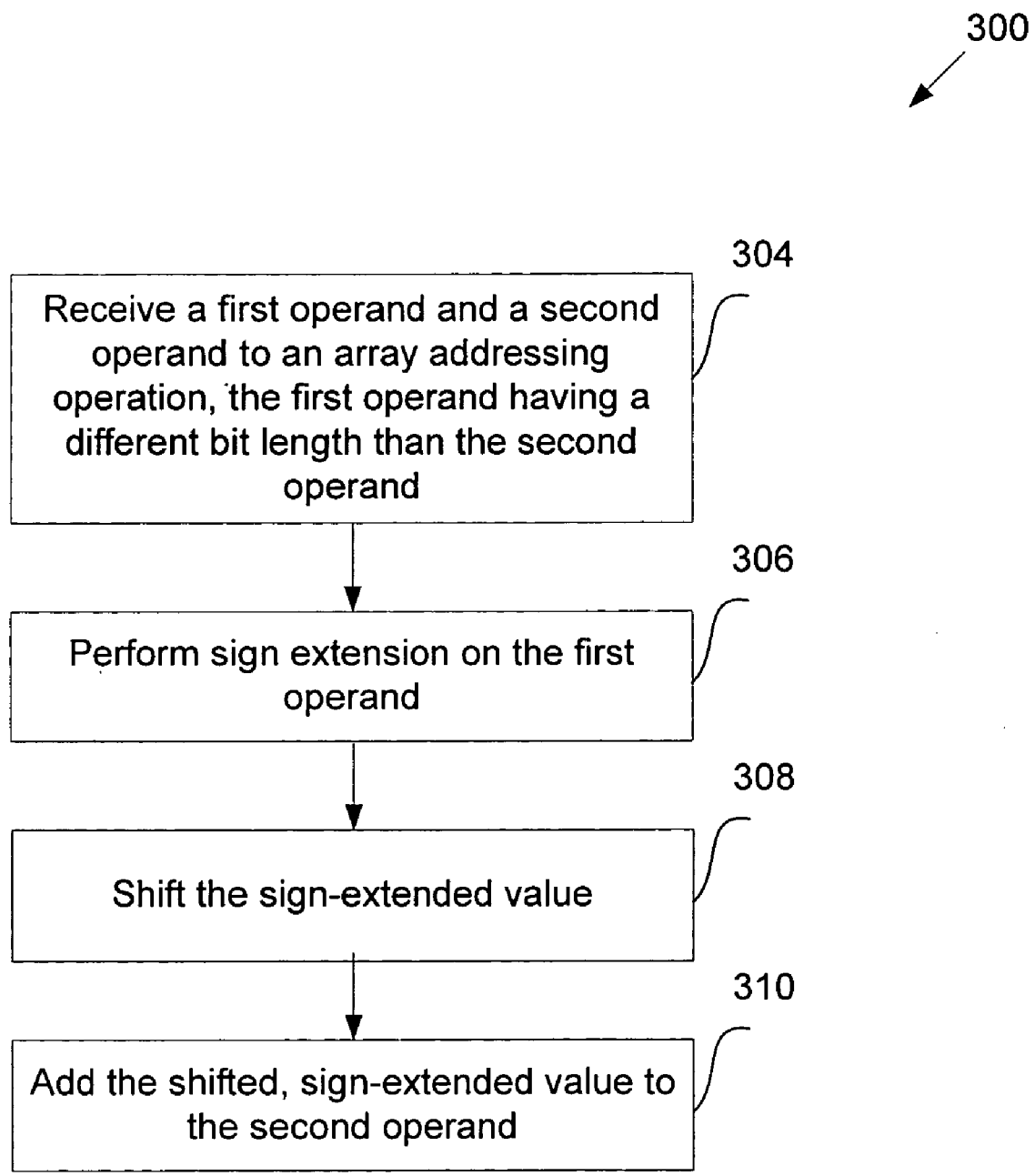
FIG. 3 is a flowchart illustrating a memory addressing process embodiment.

Some embodiments implement the sign_extend and shift_and_add instructions as a single instruction to achieve, among other things, improved efficiency. FIG. 3 is a flowchart illustrating a memory addressing process embodiment. In this example, process 300 is performed by a 64-bit processor that implements a different instruction set than what is implemented by the processor configured to carry out process 200. In some embodiments such as in some Complex Instruction Set Computing (CISC) processors, process 300 is implemented as a single instruction. The instruction may have a complex addressing mode that carries out multiple operations. The process may be expressed, for example, as:

mem_addr N32, B64.

The process initiates when two operands to a memory addressing instruction are received (304). In some embodiments, the first operand indicates the array index and the second operand indicates the array base address. The two operands have different bit lengths. Sign extension is performed on the first operand (306). The offset is computed by shifting the sign-extended first operand (308). The shifted, sign-extended value is added to the second operand to obtain the entry address of the array entry (310).

In some embodiments, process 300 is implemented using an addressing mode. As used herein, an operator refers to an instruction, an addressing mode, or other similar unit of processor activity. An operator is given one or more operands to carry out an operation such as addressing an array entry in memory.

Figure 4:
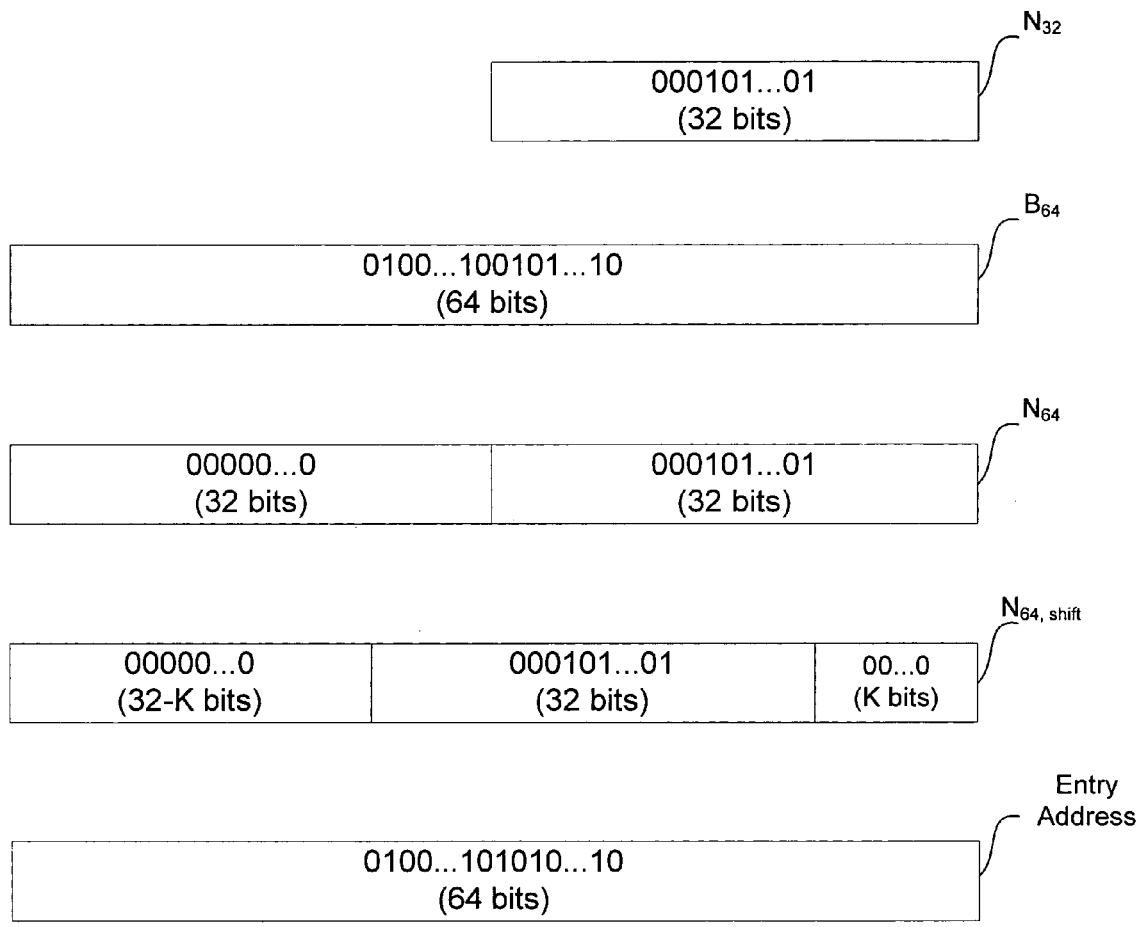
FIG. 4 is a diagram illustrating a numerical example of array addressing according to process 300.

FIG. 4 is a diagram illustrating a numerical example of array addressing according to process 300. In this example, the first operand is the entry index $N_{32}$, which is a 32 bit value. The second operand is the base address $B_{64}$, which includes 64 bits. In other embodiments, the order of the operands may be switched. Sign extension is performed on $N_{32}$ to obtain its sign-extended 64-bit equivalent, $N_{64}$. In other words, the most significant bit (the sign bit) of $N_{32}$ is replicated 32 times to generate $N_{64}$. In the example shown, a sign bit of zero is replicated. The sign bit is similarly replicated should it be one instead of zero. The offset $N_{64, shift}$ equals the entry size multiplied by $N_{64}$. Assuming an array entry size of $2^K$, the offset is computed by shifting $N_{64}$ K positions to the left and padding the least significant K bits with zeros. $N_{64}$, shift is added to the base address to generate the entry address (i.e., the entry address equals $N_{64, shift}+B_{64}$). The technique is also applicable to other environments with different bit lengths. For example, given a 16-bit entry index and a 32-bit array base address, the entry address in a 32-bit environment can be determined using a single instruction.

In the example shown, K may be any appropriate integer. In some embodiments, multiple instances of mem_addr are implemented to accommodate different values of K. The appropriate instance is selected based on the entry size. For example, mem_addr__0 is used for an entry size of 1 (K of 0), mem_addr__1 for entry size of 2 (K of 1), mem_addr__2 for entry size of 4 (K of 2), mem_addr__3 for entry size of 8 (K of 3), etc.

Addressing memory in environments where the hardware and software have different bit lengths has been disclosed. The technique described allows for efficient implementation of addressing memory in such environments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of addressing an array having an array entry size in memory, comprising:
   selecting a memory addressing operator according to a known array entry size, the memory addressing operator being selected from a plurality of memory addressing operators wherein each of the plurality of memory addressing operators corresponds to a different array entry size;
   receiving a first operand to a memory addressing operator;
   receiving a second operand to the memory addressing operator; the second operand having a different bit length than the first operand;
   performing sign extension on the first operand, including by replicating a sign bit of the first operand, to provide a sign-extended operand;
   shifting the sign-extended operand to provide a shifted, sign-extended operand; and
   adding the shifted, sign-extended operand to the second operand.

2. A method as recited in claim 1, wherein the second operand has a greater bit length than the first operand.

3. A method as recited in claim 1, wherein the memory addressing operator is an instruction.

4. A method as recited in claim 1, wherein the memory addressing operator is an addressing mode.

5. A method as recited in claim 1, wherein the first operand represents an array entry index.

6. A method as recited in claim 1, wherein the second operand represents a base address of an array.

7. A method as recited in claim 1, wherein the first operand is a 32-bit operand and the second operand is a 64-bit operand.

8. A method as recited in claim 1, wherein the first operand is a 16-bit operand and the second operand is a 32-bit operand.

9. A method as recited in claim 1, wherein the memory is addressed by a 32-bit Java program in a 64-bit Java Virtual Machine environment.

10. A method as recited in claim 1, wherein the memory addressing operator is selected from a plurality of memory addressing operators.

11. A method as recited in claim 1, wherein adding the shifted, sign-extended operand to the second operand provides an entry address of an array entry.

12. A processor configured to address memory, comprising:
   a first register configured to receive a first operand to a memory addressing operator; and a second register configured to receive a second operand to the memory addressing operator; the second operand having a different number of bits than the first operand; wherein the processor is configured to:

select a memory addressing operator according to a known array entry size, the memory addressing operator being selected from a plurality of memory addressing operators wherein each of the plurality of memory addressing operators corresponds to a different array entry size;

perform sign extension on the first operand, including by replicating a sign bit of the first operand, to provide a sign-extended operand;

shift the sign-extended operand to provide a shifted, sign-extended operand; and add the shifted, sign-extended operand to the second operand.

13. A processor as recited in claim 12, wherein the memory addressing operator is an instruction.

14. A processor as recited in claim 12, wherein the memory addressing operator is an addressing mode.

15. A processor as recited in claim 12, wherein the first operand represents an array entry index.

16. A processor as recited in claim 12, wherein the second operand represents a base address of an array.

17. A processor as recited in claim 12, wherein the first operand is a 32-bit operand and the second operand is a 64-bit operand.

18. A processor as recited in claim 12, wherein the memory is addressed by a 32-bit Java program in a 64-bit Java Virtual Machine environment.

19. A processor as recited in claim 12, wherein the memory addressing operator is selected from a plurality of memory addressing operators.

20. A processor as recited in claim 12, wherein adding the shifted, sign-extended operand to the second operand provides an entry address of an array entry.

* * * * *